United States Patent [19]

Kohring

[11] Patent Number: 5,205,190
[45] Date of Patent: Apr. 27, 1993

[54] STABILITY HIGH GAIN AND DYNAMIC STIFFNESS SERVO AXIS DRIVE SYSTEM AND METHOD

[75] Inventor: Mark D. Kohring, West Chester, Ohio

[73] Assignee: Cincinnati Milacron, Inc., Cincinnati, Ohio

[21] Appl. No.: 924,223

[22] Filed: Aug. 3, 1992

[51] Int. Cl.⁵ .......................... F16F 15/10; F16H 7/10
[52] U.S. Cl. ........................................ 74/574; 74/572; 74/604; 474/112; 464/180
[58] Field of Search ...................... 74/572, 573 R, 574, 74/603, 604; 474/109, 112; 464/180

[56] References Cited

U.S. PATENT DOCUMENTS

| | | | |
|---|---|---|---|
| 2,346,732 | 4/1944 | Crawford et al. | 74/574 |
| 2,346,972 | 4/1944 | Kishline | 74/574 |
| 2,585,382 | 2/1952 | Guernsey | 74/574 |
| 2,714,823 | 8/1955 | Dall et al. | 74/574 |
| 3,486,585 | 12/1969 | Richter et al. | 74/574 |
| 3,522,864 | 8/1970 | Richter | 188/1 |
| 3,545,301 | 12/1970 | Richter | 188/1 |
| 3,749,372 | 7/1973 | Funk | 74/574 |
| 4,036,030 | 7/1977 | Papst | 464/180 X |
| 4,171,147 | 10/1979 | Swisher et al. | 74/574 X |
| 4,311,120 | 1/1982 | Freyn et al. | 474/112 X |
| 4,377,992 | 3/1983 | Zeilinger et al. | 74/604 X |
| 4,598,671 | 7/1986 | Gluck et al. | 74/604 X |
| 4,664,624 | 5/1987 | Dufresne | 74/574 X |
| 4,722,308 | 2/1988 | Wall | 74/603 X |
| 4,796,728 | 1/1989 | Kanengieter et al. | 74/574 X |
| 4,924,727 | 5/1990 | Pearl et al. | 74/604 X |
| 4,955,330 | 9/1990 | Fabi et al. | 74/574 |

FOREIGN PATENT DOCUMENTS

| | | | |
|---|---|---|---|
| 0177333 | 8/1987 | Japan | 74/604 |
| 2169035 | 7/1986 | United Kingdom | 74/604 |

OTHER PUBLICATIONS

Shock and Vibration Handbook, Edited by Harris and Crede, Second Edition, McGraw-Hill Book Company, 1976, various pages.
"Eliminating Instabilites in Motion Control Systems Caused by Torsional Resonance", by Torsional Resonance, by Gregory J. Schneider, *Motion* Fourth Quarter, 1985, pp. 4–8.
"Taming Resonance in Servos", by Gregory J. Schneider, *Machine Design*, Feb. 7, 1985, pp. 73–76.

*Primary Examiner*—Vinh T. Luong
*Attorney, Agent, or Firm*—Frost & Jacobs

[57] ABSTRACT

A high gain and high torsional stiffness servo axis drive system for machine tools is described as providing improved stability. This system includes a servo motor mounted on a base and connected to a C-Axis spindle drive arrangement via a toothed drive belt. A first by-damper is attached to the spindle drive pulley and tuned for damping torsional oscillations of the servo output shaft, belt, and spindle when the system is not fitted with a workpiece. An independent second damper is attached to the driving pulley of the servo motor and tuned for damping torsional oscillations of the entire servo drive system when the system is loaded with a workpiece. The resulting servo axis drive system features improved stiffness and can be adapted to a variety of predetermined loading conditions by convenient retuning of the second damper. At least the second damper is provided as a combination of a damper mass ring attached to the servo motor pulley by a plurality of viscoelastic damping elements. It is contemplated that the damping elements can be easily substituted to retune the system for different loading conditions.

8 Claims, 5 Drawing Sheets

STABILITY HIGH GAIN AND DYNAMIC STIFFNESS SERVO AXIS DRIVE SYSTEM AND METHOD

BACKGROUND OF THE INVENTION

Rotary axes for modern day machine tools must exhibit increasingly accurate and reliable rotary control and effective torsional dynamic stiffness. Incorporation of electronically driven servo axes for the drive arrangement of a machine tool spindle or C-axis drive system is one preferred manner for providing capabilities of improved accuracy and control. In order to provide such a drive system exhibiting a predetermined torsional stiffness, the position and velocity loop gains of the system must be set at relatively high levels.

While dynamic stiffness generally increases with increased loop gains, at some point, the increased gains can cause instabilities in the system. Particularly, the inertia of the rotary axis coupled throuhh a direct drive train to a servo motor device can often exhibit instabilities which can adversely affect the performance of the machine tool. Such instabilities further limit the amount of loop gain and torsional stiffness which can be obtained on the system, and, consequently, such oscillation and/or vibration must be effectively eliminated from the servo axis.

Various torsional damping arrangements have been known and used in the industry for addressing oscillations of mechanically driven crankshafts and the like. For example, U. S. Pat. No. 2,585,382, which issued to R. Guernsey, describes a torsional vibration damper for a rotatably driven crankshaft wherein a damping mass is elastically situated for rotation relative to the crankshaft, and a second damping mass is housed within a viscous fluid. Viscoelastic shear between the first mass and a rubber annulus connecting that mass to the crankshaft provides a vibration damp, while oscillation of the rotating second mass causes shear between the mass and its viscous fluid support, thereby damping oscillatory movements. Tuning of this device can be affected by changing the elastic unit or by changing the amount of mass of the dampers.

Another damping device for a rotatable shaft is shown in U.S. Pat. No. 3,545,301, which issued to R. Richter. Similar to the Guernsey arrangement, the Richter stepping motor damper includes a strip of viscoelastic material wrapped around the shaft and held in a constant strain preload by the inside diameter of a damping mass attached to the rotatable output shaft. The polar mass moment of inertia of the damping mass is perferably chosen to be about 50% of that of the motor, and the stiffness of the damping element is determined so as to preferably be effective for the full variation in torsional natural frequency of the motor. This arrangement, however, is directed toward only the motor dynamics and does not address compound system of a motor, transmission and load.

Other torsional type damping devices have also been utilized, such as that shown in U.S. Pat. No. 2,346,732, which issued to J. Crawford, et al. The Crawford vibration damper comprises a drive plate formed as a disk of thin steel which is cut away to provide a peripheral rim and a plurality of radial spokes. This drive plate is made relatively thin so that its rim can follow a true rotational path while its hub may wobble. A dampener spider formed as a sheet metal disk having a discontinous rim and radial arms which attach to friction pads is provided. The friction pads bear against a continuous friction ring so that radial movement of the spider arms caused by wobbling of the drive plate hub is damped by friction.

A damper for vibration induced by tool and cutter impacts (chatter) in rotary tool supporting members is shown in U.S. Pat. No. 2,714,823, which issued to A. Dall, et al. Like the Guernsey torsional vibration damper discussed above, the Dall damper includes a heavy leas weight or inertia member rotatably housed within a chamber wherein springs help develop a predetermined friction between the weight and its surrounding walls. The Dall, et al damping disk is subject to both relative rotary and radial movement, and because the vibration impulse is transferred through a broad band type frictional connection, a time delay causes the momentum in the weight to oppose vibration forces, resulting in relative damping.

Similarly, a vibration dampener attached to a crankshaft pulley is shown in U.S. Pat. No. 2,346,972, which issued to F. Kishline. Particularly, the Kishline vibration dampener includes a wheel with a flat disk-shaped portion fixed to a crankshaft by a key, wherein the forward face of the wheel has a series of pockets each containing a cylindrical inertia member. These inertia members oppose acceleration and deceleration forces in a manner out-of-phase with such forces, thereby offsetting and canceling vibration and oscillation forces in the rotating shaft.

It is also known that servo systems perform erratically when output transducers resonate at frequencies within the operating bandwidth of the system. To this end, conventional wisdom indicates that a compensating network, such as a bridged-T, be contained within the system loop to insure stability of servo systems containing resonating output transducers. In such networks, resistors and capacitors are variously utilized to offset gain and phase characteristics of the transducers. Damping ratios and natural frequencies are determined by calculations to meet the requirements for stable operation. Precise cancellation of the poles is difficult, but has been found to be unnecessary for stable operation. High precision components, however, must be utilized, and effects of aging and operating conditions such as temperature must be considered in selecting components to maximize potential for continued system stability.

It is also recognized that instabilities in these systems can be addressed by lowering the servo loop gains, but, as indicated above, rotary axis stiffness is also forfeited in that process. Consequently, typically, resonances in servo systems are most often minimized by incorporation of a compensating network in the servo control to filter or offset such resonance.

Despite the various structural devices known for damping oscillations of mechanically driven shafts, and the relatively sensitive high precision filter-type compensating networks for servo systems, there has not been previously available a relatively simply mechanical arrangement for dependably damping vibrations and oscillations of an electronically driven servo axis. Instabilities resulting from the relatively high position and velocity loop gains required to provide certain predetermined torsional stiffness for increased accuracy and reliability created serious limitations and/or problems in many applications. A simple and tunable dynamic damper capable of minimizing servo oscillations and vibrations while allowing optimum position and velocity loop gains and torsional stiffness in a stable manner was needed.

DISCLOSURE OF THE INVENTION

It is an object of this invention to obviate the above-described problems and shortcomings of damping structures and servo axis drive assemblies heretofore available in the industry.

It is another object of the present invention to provide a high gain and dynamic stiffness servo axis drive system which features improved stability in both rotating and stationary conditions.

It is also an object of the present invention to provide an improved method for obtaining high gain and high torsional stiffness servo axis drive systems with improved stability.

It is yet another object of the present invention to provide a high gain and high torsional stiffness servo axis drive system and method wherein the damping assembly includes a plurality of damping elements tuned to the natural frequencies of the entire drive system.

It is yet another object of the present invention to provide a method for improving the stability of a high gain and high torsional stiffness servo axis drive system wherein a first damping arrangement is provided and tuned to the natural frequency of the system in unloaded condition, and a second damping assembly is provided and tuned to the natural frequency of the system in loaded condition.

It is also an object of the present invention to provide a servo axis drive system with improved static stiffness which includes a plurality of damping assemblies tuned to the natural frequency of a servo axis drive system comprising a spindle drive, servo motor, and belt drive connection between the motor and spindle.

In accordance with one aspect of the present invention, there is provided a high gain and high torsional stiffness servo axis drive system for machine tools and the like and featuring improved stability. The system includes a base, a spindle having first and second ends and rotatably supported with respect to the base along a spindle axis, a chuck or similar structure for securing a workpiece to the first end of the spindle, a spindle drive pulley affixed adjacent the second end of the spindle, a servo motor mounted on the base, and, preferably, a belt drive connection between the servo motor output shaft driving pulley and the spindle drive pulley. A first damping assembly is attached to the spindle drive pulley and tuned for damping torsional oscillations of the output shaft, belt, and spindle when the system is not fitted with a workpiece (i.e., unloaded condition). An independent second damping assembly is attached to the driving pulley connected to the output shaft of the servo motor, and tuned for damping torsional oscillations of the servo motor driving pulley and the chuck in conjunction with the first damping assembly when the system is fitted with a workpiece (i.e., loaded condition).

In a preferred embodiment, the spindle is the C-axis of a machine tool drive unit. Also in a preferred arrangement, the first and second damping assemblies each include a damping mass disk attached to the spindle drive pulley and the driving pulley respectively, by at least one viscoelastic damping element. To simplify the tuning procedures, it is contemplated that damping elements of varying predetermined stiffness can be interchanged for connecting the damping mass disks, as appropriate. It is preferred that the first damping assembly be provided and tuned prior to tuning of the second damping assembly once the servo axis drive system is placed in loaded condition.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
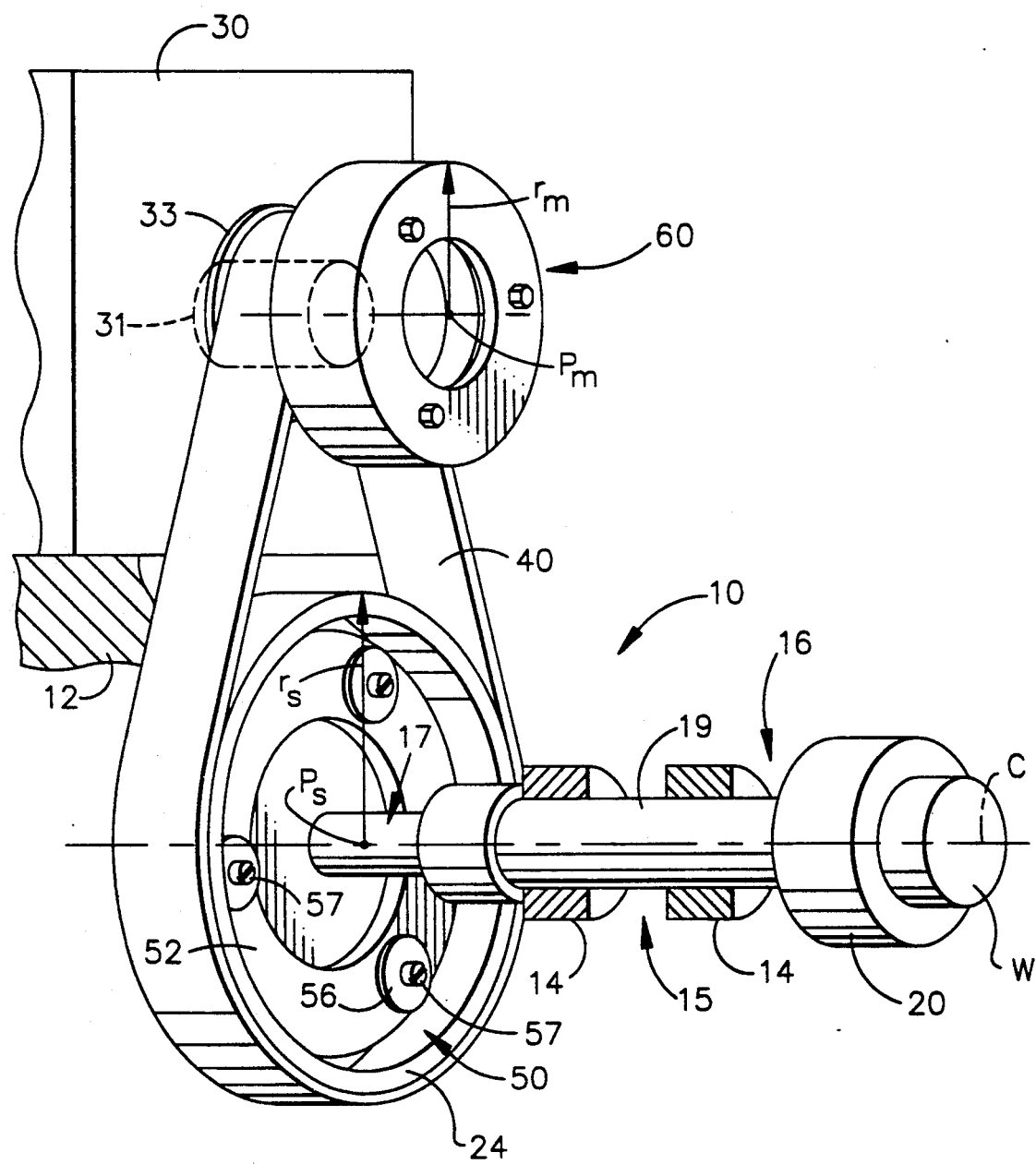
FIG. 1 is a simplified, schematic illustration of a servo axis drive system made in accordance with the present invention.

Referring now to the drawings in detail, wherein like numerals indicate the same elements throughout the views, FIG. 1 is a simplified schematic view of an exemplary high gain, high torsional stiffness servo axis drive system 10 as contenplated in the present invention. Servo drive system 10 can be part of a machine tool or similar device, and is illustrated as comprising a servo motor 30 mounted on a base 12 and having a rotary output shaft 31. A spindle 15 includes a first end 16 and a second end 17, and is illustrated as rotatably mounted by bearings 14 along a spindle axis C. Spindle 15, which may preferably comprise a C-axis drive arrangement for a machine tool or the like, is illustrated as including a spindle shaft 19 and means such as chuck 20 for securing a workpiece (W) adjacent first end 16 of spindle 15.

Affixed adjacent second end 17 of spindle 15 is a spindle pulley 24 or similar spindle drive means for rotatably driving the spindle. A pulley is preferred when the means for connecting the servo output shaft with the spindle comprises a drive belt (e.g., belt 40). The radial center of spindle drive means 24 is illustrated as the center point $P_s$, from which the radius ($r_s$) of the pulley extends in the figure.

A servo driving member is preferably provided as a second pulley 33 having a radius $r_m$, as indicated from the radial center $P_m$. While the means for connecting servo output shaft 31 with spindle drive means 24 preferably includes a drive belt (e.g., 40) and a servo driving member or pulley (e.g., 33), other rotation connection arrangements could equally be substituted in appropriate applications. For example, while a direct belt drive arrangement is illustrated in the schematic view of FIG. 1, alternative arrangements might include a jack shaft assembly or other transmission arrangement.

Figure 2:
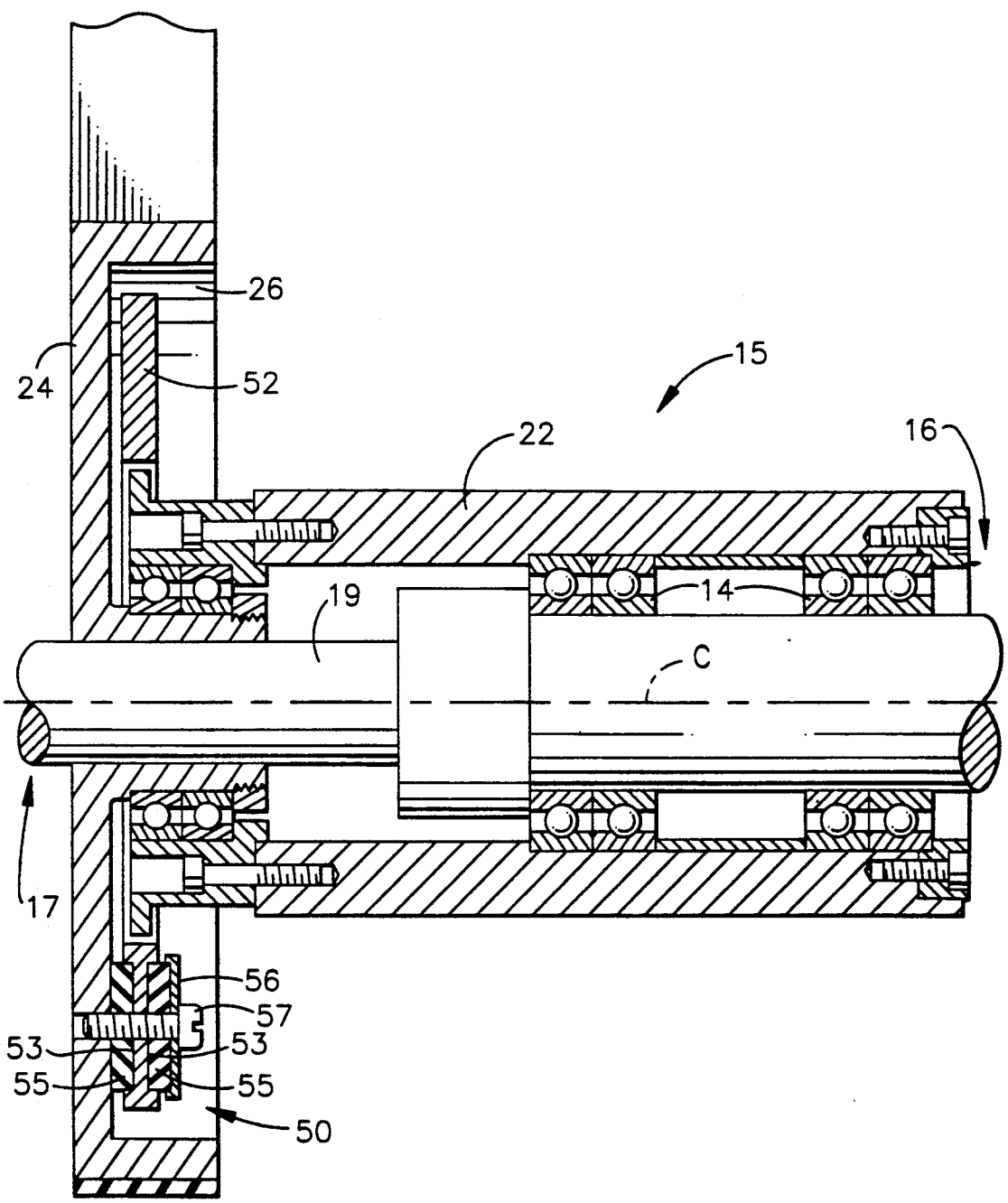
FIG. 2 is a partial, enlarged and simplified cross-sectional view of a preferred arrangement of the first damping means of the present invention.
Figure 4:
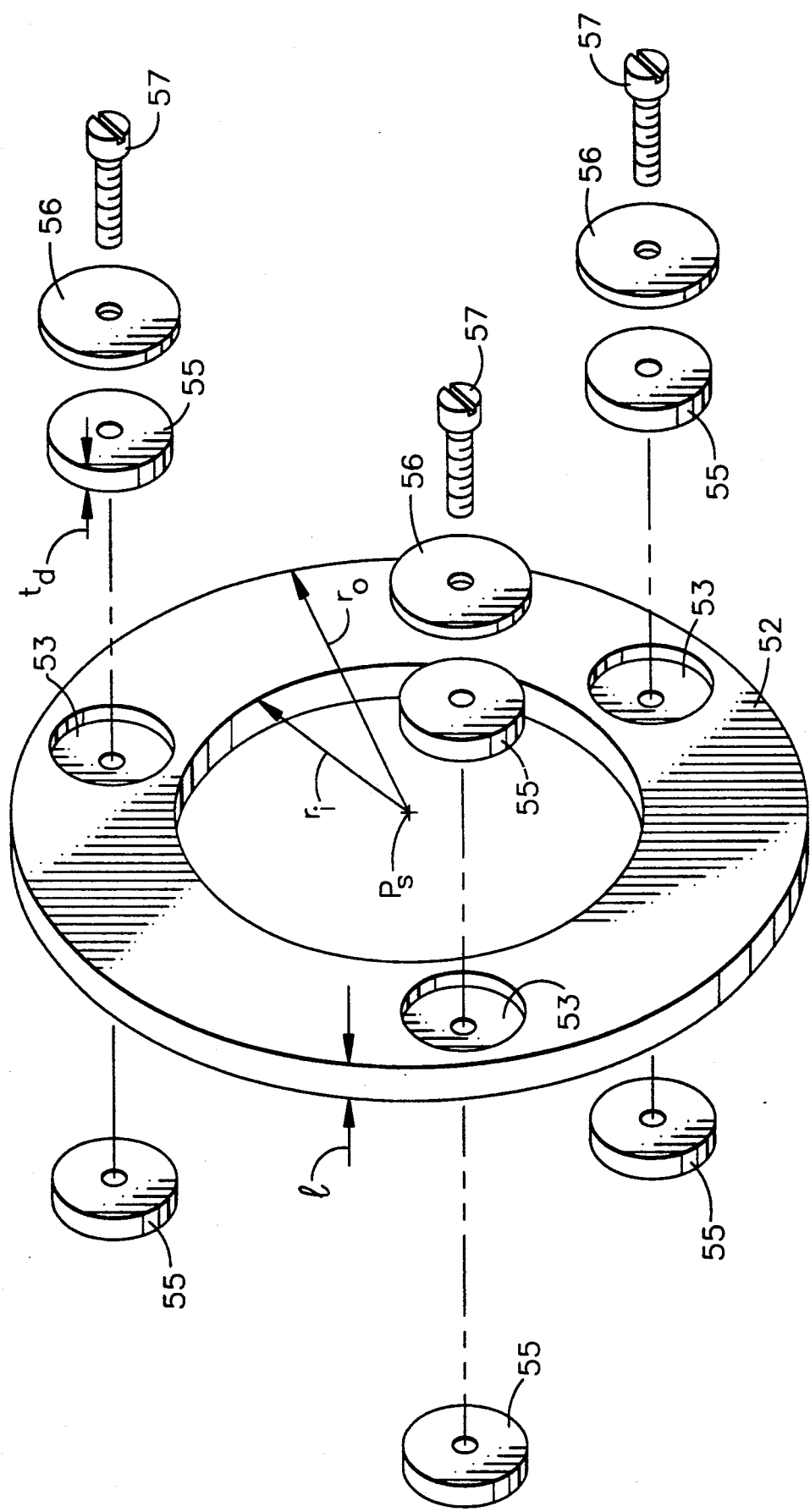
FIG. 4 is an exploded perspective view showing details of the first damping means of FIG. 2.

As indicated above, because it was found that static (i.e., zero velocity command) servo oscillation and belt vibration were observed in high gain and high torsional stiffness servo axis drive systems of the type schematically illustrated in FIG. 1, a combination of damping means successfully overcame the stationary oscillations and provided a stable system. In this regard, modal analysis indicated that in undamped condition servo motor 30 and spindle 15 were oscillating out-of-phase with each other against the longitudinal stiffness of belt 40. The system was acting effectively as two masses (motor 30 and its pulley 33, and spindle 15 and its pulley 24) connected by a spring (e.g., belt 40) of predetermined stiffness. A first damping means (e.g., 50) was attached adjacent the second end 17 of spindle 15 on spindle drive pulley 24, as schematically indicated in FIG. 1. FIGS. 2 and 4 provide additional details of a preferred first damping means 50 as it might be attached to a driving member or pulley 24.

Turning now to FIG. 2, servo driving member 24 is illustrated as including a substantially hollow interior portion 26 within which first damping means 50 can be conveniently mounted. Driving member 24 is illustrated as being connected to spindle shaft 19, which is in turn rotatably mounted by a series of bearings 14 within a spindle housing 22. As best seen in FIG. 4, first damping means 50 preferably comprises a damping mass disk or ring 52 having an inside radius $r_i$ and an outside radius $r_o$, with a ring thickness of l. A plurality of recesses 53 are preferably spaced about the periphery of ring 52, and are provided in aligned condition on both sides or faces of ring 52. Particularly, recesses 53 are designed to receive and retain at least a pair of oppositely disposed damping elements 55, wherein at least one damping element 55 is retained on either side of ring 52 for mounting onto drive pulley 24. As also shown, three spaced recess locations are preferably utilized to maintain planar alignment between ring 52 and pulley 24.

It is contemplated that damping elements 55 will be provided of viscoelastic material of predetermined stiffness, and can take the form of relatively flat plaque-like members or, alternatively, toroidal shaped viscoelastic absorber elements as described in U.S. Pat. No. 3,522,864 (the disclosure of that patent being hereby incorporated herein by reference). As a result. damping mass disk 52 is effectively "sandwiched" between a plurality of viscoelastic damping elements 55 as indicated. Particularly, it is contemplated that a screw or bolt 57 will be inserted through a retainer 56, damping elements 55 on either side, and ring 52 and into a portion of drive pulley 24 (e.g., hollow portion 26), as best seen in FIG. 2.

Because the resulting stiffness of the viscoelastic damping elements is a property of both the material shear modulus and shape of the elements themselves, the type of viscoelastic material chosen, and their shape, stiffness may be utilized to determine the shear modulus of the material for proper tuning of damping means 50. As shown in the example below, first damping means 50 is tuned to attenuate the servo loop gain of system 10 when in unloaded condition (i.e., without a workpiece W mounted). Torsional oscillations are thereby minimized to stabilize the system. First damping means 50 is tuned to the natural frequency of the unloaded servo axis drive system, including particularly driving member or pulley 33 and the inertia of motor 30 (i.e., the polar moment of inertia of the rotor and shaft), belt 40, drive pulley 24, and spindle 15. While three equally spaced locations of pairs of viscoelastic damping elements 55 are preferred for planar alignment, various similar arrangements of damping elements and attachment locations could be equally substituted as appropriate.

While the first damping means adequately removes instabilities even with the high gains and high torsional stiffness of the servo axis drive system 10 when in unloaded condition, when loading is applied to the system, it was found that the gain factor of the servo loop increased sufficiently to cause stationary torsional oscillation and instability in the system. Additional modal analysis indicated that the loaded system functioned effectively as a three mass system (motor 30 and its pulley 33, spindle drive pulley 24, and load or workpiece W) connected by a pair of "spring" elements (i.e., belt 40 and spindle shaft 19). Particularly, load W and motor pulley 33 were effectively oscillating against one another, with the previously damped spindle drive means acting substantially as a nodal point therebetween.

Figure 3:
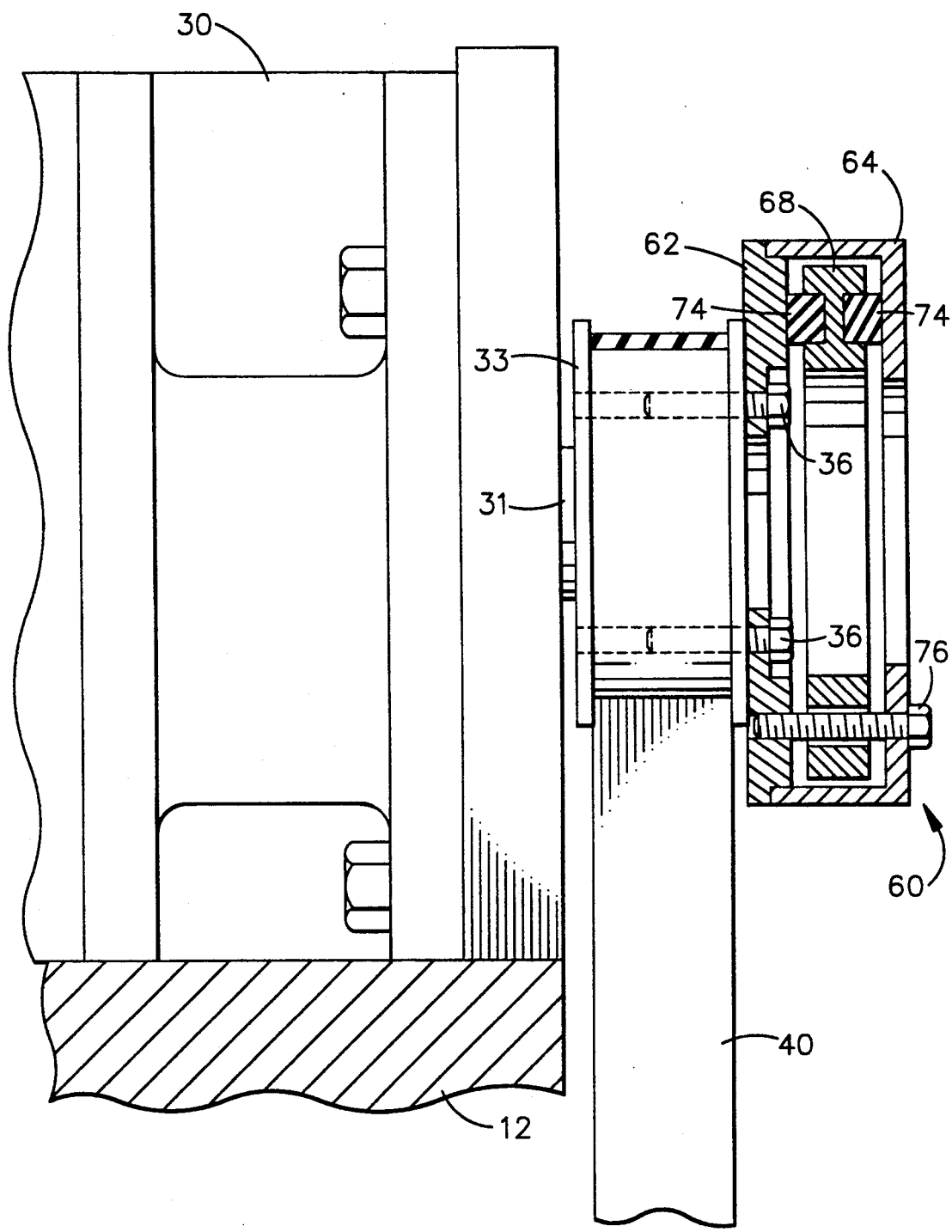
FIG. 3 is a partial, enlarged cross-sectional view of a preferred arrangement of the second damping means of the present invention.
Figure 5:
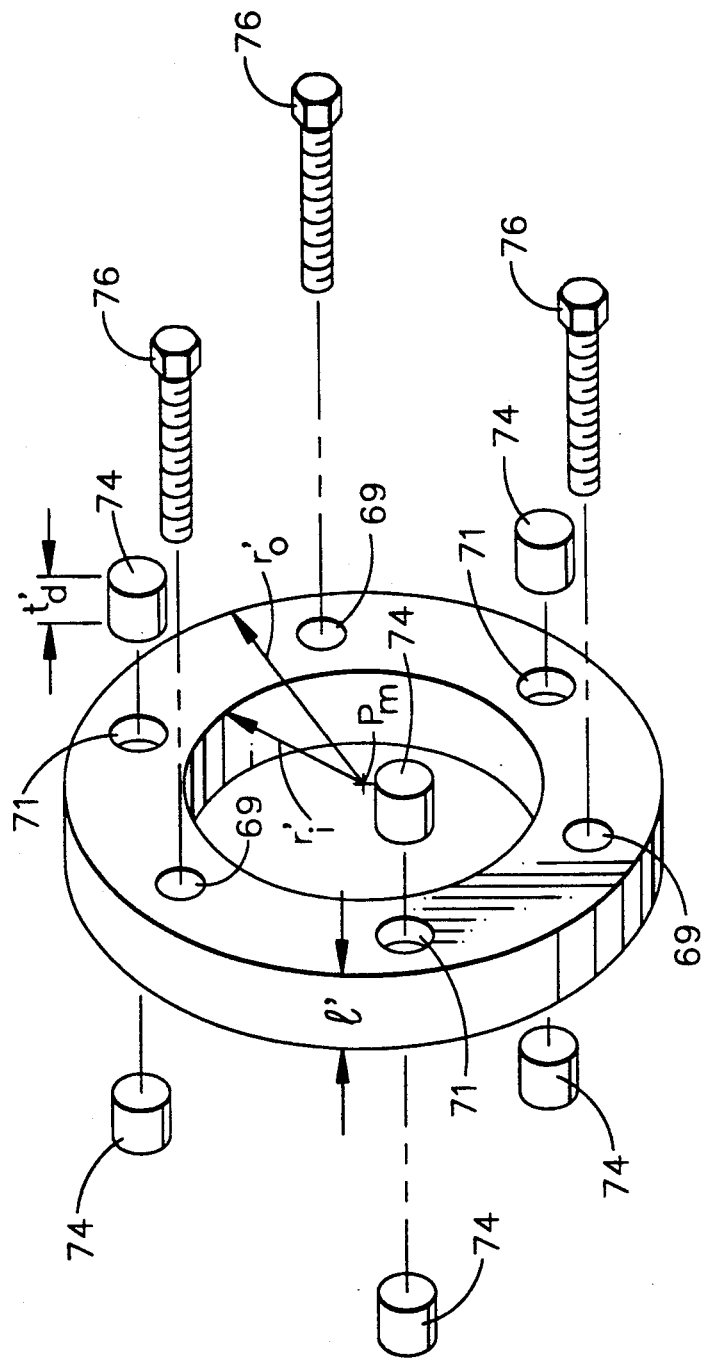
FIG. 5 is an exploded perspective view showing details of a portion of the second damping means of FIG. 3.

An independent second damping means 60 was thereafter provided to remove undesirable servo loop gain and instabilities from the loaded system. As best seen in FIGS. 3 and 5, second damping means 60 preferably comprises an assembly having a damping mass disk or ring 68 mounted within a housing defined by an inner ring 62 attached to pulley 33 via a plurality of bolts 36, and an outer ring 64. Damper ring 68 is illustrated in FIG. 5 as having an inner radius $r'_i$ and an outer radius of $r'_o$, with a ring thickness of l'. Damper ring 68 comprises a plurality of radially spaced bores 69 for accommodating attachment bolts 76, and further includes a plurality of spaces recesses 71 for receiving oppositely facing pairs of viscoelastic damping elements 74. In this way, damper ring 68 is similarly effectively "sandwiched" between inner ring 62 and outer ring 64 by the viscoelastic damping elements to provide a tunable damping assembly for removing instabilities from the loaded system.

Particularly, the shear modulus of the damping elements 74 can be utilized to appropriately calculate and tune the stiffness of the individual damping elements 74 to attenuate undesirable servo loop gain and instabilities of the loaded system 10 as illustrated in FIG. 1. As will be understood, second damping means 60 is tuned to the natural frequency of the entire system 10 after first damping means 50 has been appropriately tuned to attenuate loop gains and instabilities of the unloaded system as discussed above. Once the first damping means is properly tuned in unloaded condition, second damping means 60 can be tuned to attenuate instabilities in the loaded condition in conjunction with first damping means 50. In this way, if loading conditions are changed from time to time during the life of the machine tool or the like, second damping means 60 can be appropriately retuned to accommodate an appropriate range of loaded conditions.

EXAMPLE

As an example of implementation of the present invention in a machine tool was set up with a C-axis type spindle 15. Such a machine can be obtained in the industry from Cincinnati Milacron Inc. of Cincinnati, Ohio under the designation "NIGHTHAWK ™" CNC Multipurpose Processing Center. A 140 tooth pulley was utilized as the drive means (spindle pulley 24), and an electric servo motor such as available in the industry from sources, such as Siemens Energy (Little Rock, Ark.) or G. E. Fanuc (Charlottesville, Va.), was provided with a 34 tooth pulley. A toothed drive belt (e.g., belt 40), such as a poly chain available from Gates Rubber Co. (Denver, Colo.), was utilized to connect the servo motor with the C-axis spindle. The stepdown speed ratio between the spindle and motor was 4.118:1 (based upon the ratio of pulleys) in this example. In order to properly size damper ring 52 of first damping means 50, a modal mass calculation was performed utilizing the following formula defining the natural frequency of the undamped system, where the spindle and motor are opposite in phase:

$$\omega_r^2 = \frac{[I_s (r_m/r_s)^2 + I_m]}{I_s (r_m/r_s)^2 \cdot I_m} \cdot K_B r_m^2 \quad (1)$$

Wherein:
$\omega_r$ = natural resonant frequency
$I_s$ = inertia of the spindle
$I_m$ = inertia of the motor
$r_m$ = radius of the drive pulley
$r_s$ = radius of spindle pulley
$K_B$ = belt stiffness (tangential spring constant)

In this regard, $$\frac{[I_s (r_m/r_s)^2 + I_m]}{I_s (r_m/r_s)^2 \cdot I_m}^{-1}$$

can be considered to be the "effective" or "modal" mass of the oscillatory system comprising the spindle, motor, pulleys and belt.

Because the inertia of each of the various parts will vary between applications, it is important to note that in the example, the following inertias were observed:

| ITEM | INERTIA | REFLECTED TO MOTOR SHAFT (4.118:1 RATIO) |
|---|---|---|
| Spindle & 140 T spindle pulley | = 3.658 lb-in-s² | 0.2157 lb-in-s² |
| Chuck | = 0.9585 | 0.0565 |
| Workpiece | = 0.5181 | 0.0306 |
| 34 T motor pulley | = 0.0098 | 0.0098 |
| Motor armature | = 0.1609 | 0.1609 |

Consequently, the inertia for the motor and the spindle or C-axis drive reflected to the motor shaft can be figured as follows:

$I_m = (0.1609 + 0.0098) = 0.1707$ lb-in-s²

$I_s(r_m/r_s)^2 = (0.2157 + 0.0565 + 0.0306) = 0.3028$ lb-in-s²

Hence, modal mass $$I_{eq} = \frac{.3028 + .1707}{(.3028)(.1707)} = .1092 \text{ lb-in-s}^2$$

Calculated at axis C:

$(r_s/r_m)^2 I_{EQ} = (4.118)^2(0.1092) = 1.852$ lb-in-s²

In order to calculate the inertia of the damping mass disk (e.g., 52) of the first damping means, the following formula can be utilized:

$$I_D = \frac{\pi(D_o^4 - D_i^4)}{32} \cdot p/g \cdot l \quad (2)$$

Wherein:

$I_D$ = inertia of the damping mass disk or ring
$D_0$ = outside diameter of the damping mass disk or ring
$D_i$ = inside diameter of the damping mass disk or ring
p = specific weight of the material from which the disk or ring is made
g = gravitational acceleration
l = thickness of the disk or ring In a preferred arrangement, damping mass ring 52 is sized such that $I_D \approx 0.35\ I_{eq}$ such that its inertia will be sufficient to be effective. In an exemplary damping mass disk or ring for the C-Axis drive, the inner diameter ($D_i$) was 8 inches, while the outside diameter ($D_o$) was 11.75 inches. The inertia of the damper ring would thus be:

$$I_D = \frac{\pi(D_o^4 - D_i^4)}{32} \cdot \frac{p}{g} \cdot l = \frac{\pi}{32}(11.75^4 - 8^4)\frac{(.283)}{386}(.5)$$
$$= .700 \text{ lb-in-s}^2$$

Such that $$\frac{I_D}{I_{eq}} = \frac{.700}{1.852} = .378 \text{ or about } 38\%$$

The measured frequency of the undamped system was 145 Hz (measured by experimental modal analysis, FRF measurement, or the like). The damping ring and its damper elements will be applied as a damped, single degree of freedom system in series with the undamped spindle, motor, pulley and belt system. The single degree of freedom damper system is tuned to approximately 145 Hz to extract energy at the correct frequency, and the frequency equation for a single degree of freedom rotary mass-spring system is as follows $$\frac{Kr^2}{I} = \omega^2 \quad (3)$$

For six damping elements 55, the required damping element stiffness is therefore calculated as follows:

$$\frac{K_D r^2}{I_D} = (2\pi \cdot 145)^2$$

$K_D r^2 = 581,000$ lb-in/RAD $r = \frac{(11.75 + 8)}{4} = 4.94$ inches $K_D = \frac{581,000}{(4.94)^2} = 23,800$ lb/in $(1/6)K_D = 3970$ lb/in (per damper location)

In order to determine the proper size of the damping elements (e.g., 55) of the first damping means (e.g., 50), the stiffness of the damper means can be calculated once a particular viscoelastic material has been chosen for the elements. An example of viscoelastic material which might preferably be employed in damping elements 55 is material available in the industry under the name E.A.R. (as available from Specialty Composites Division of Cabot Safety Corp. of Newark, Del.). From the calculations shown above, the required stiffness for each damper location is 3970 lb/in. The effective stiffness of the damping means will be established by the respective stiffness of the damping elements utilized (e.g., elements 55), and can be related to the following equation:

$$\text{Required Stiffness} = 3970 \text{ lb/in} = G_{EAR}(A/l)_{EAR}$$

Wherein:
$G_{EAR}$ = the shear modulus
A = area of each of the damping elements
l = thickness of each of the damping elements
Shear stiffness of the damping element can also be calculated as follows:

$$K_E = GA/h \qquad (4)$$

Where G = shear modulus A = area, and h = thickness $$G = E/2(1+P)$$

Where
E = elastic modulus (this number obtained from manufactures data) of the material; and
P = Poisson's Ratio (which is typically about 0.5 for viscoelastic materials).
For an elastic modulus $$E = 8 \times 10^6 \text{ N/m}^2 \text{ (1160 lb/in}^2\text{)}$$

In this example, $$G = 387 \text{ lb/in}^2 = \frac{E}{2(1 + .5)}$$

Because the required stiffness per damper attachment location was calculated above as 3970 lb p/i (i.e., that is the $K_{EQ}$ required for each location), the area of each damper can be figured as follows (assuming 0.25 inches nominal thickness material):

$$K_{EQ} = GA/h$$

$$3970 \text{ lb/in} = 387 \cdot A/(0.25)$$

$$A = 2.57 \text{ in}^2$$

In this example, the motor damper or second damping means (e.g., 60) would be designed and tuned in a manner similar to that described above with respect to the first damping means. However, the inertia of the load or workpiece (e.g., W) would also have to be considered in tuning this damping assembly to the natural frequency of the combined system. In this regard, the inertia of the load ($I_L$) must be added to the inertia of spindle ($I_S$) in equation (1) set forth above for determining the natural frequency for the servo axis drive system (e.g., 10). Once the equalization inertia is determined for the second damping means, the mass of the damper ring (e.g., ring 68) is similarly calculated as set forth above. The required stiffness per damper location and the area and dimensions of the damping elements (e.g., element 74) of the second damping means are similarly calculated in accordance with the equations set forth above. Once the required inertia is calculated for stabilizing the torsional oscillations of the loaded system.

Once a servo axis drive system (e.g., 10) is provided with the first and second damping means tuned as explained above, the system is ready for the use and should be stable for workpieces having a range of inertia masses approximately equal to the mass contemplated in the turning procedures. The fact that the dynamics of the closed velocity loop for the C-axis control is made more stable by the implementation of the present invention can be physically verified by monitoring velocity loop plots (e.g., (e.g., db magnitude vs. frequency) of the system in action, and can be theoretically verified by use of a simulation model and closed loop velocity equations. Such modeling and mathematical verification can be completed by those of ordinary skill in the damping and/or servo control technologies utilizing well known inertia equations, and further detail of these calculations will therefore be omitted herein.

By providing second damping means 60 as an assembly of damper ring 68 and a plurality of damping elements 74 generally received in recesses 71, however, drive system 10 can be easily returned to accommodate a different range of workpiece sizes. While a damper ring of different mass may be required in some instances of relatively severe changes in workpiece mass ranges, for many variations, the returning can be accomplished by simply choosing damping elements 74 of varying materials stiffness properties and/or geometric features (i.e., shape and thickness). For example, where higher viscoelastic stiffness is required, material of higher elastic modulus might be utilized and/or the thickness of the damping element could be appropriately decreased or the area could be increased. Various damping elements might be prefabricated to accommodate predetermined ranges of stiffness requirements, and maintained for ready availability as appropriate during machine manufacturing and/or operation procedures.

Having shown and described the preferred embodiments of the present invention, further adaptions of the servo axis drive system and method described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and function shown and described in the specification and drawings.

I claim:

1. A high gain and high torsional stiffness servo axis drive system for machine tools with improved stability, said system comprising:
    a base;
    a spindle rotatably supported with respect to said base, said spindle comprising first and second ends;
    means on said spindle for securing a workpiece adjacent said first end of said spindle;
    a spindle drive mens affixed adjacent the second end of said spindle for rotatably driving said spindle;
    a servo motor mounted on said base and having a rotary output shaft;
    means for connecting said servo output shaft with said spindle drive means, said connecting means comprising a driving member affixed to said shaft;
    first damping means attached to said spindle drive means and tuned for damping torsional oscillations of the output shaft, connecting means, and spindle drive means when said system is not fitted with a workpiece; and
    independent second damping means attached to said driving member and tuned for damping torsional oscillations of said driving member, connecting means and spindle in conjunction with said first damping means when said system is fitted with a workpiece.

2. The servo axis drive system of claim 1, wherein said spindle comprises a C-axis machine tool drive system.

3. The servo axis drive system of claim 1, wherein said first damping means comprises a damping mass disk attached to said spindle drive means by at least one viscoelastic damping element.

4. The servo axis drive system of claim 3, wherein said first damping means comprises a plurality of viscoelastic damping elements spaced about the disk.

5. The servo axis drive system of claim 1, wherein said first damping means is tuned to the unloaded natural frequency of the servo axis drive system.

6. The servo axis drive system claim 5, wherein said second damping means is tuned to the loaded natural frequency of the servo axis drive system.

7. The servo axis drive system of claim 1, wherein said second damping means comprises a damping mass disk attached to said driving member by at least one viscoelastic damping element of predetermined stiffness.

8. The servo axis drive system of claim 1, wherein said spindle drive means and said driving member each comprises a pulley, and said connecting means further comprises a belt.

* * * * *